US012138218B2

(12) United States Patent
Ayd

(10) Patent No.: US 12,138,218 B2
(45) Date of Patent: Nov. 12, 2024

(54) QUADRATUS LUMBORUM MASSAGE APPARATUS AND TECHNIQUES

(71) Applicant: Benjamin Ayd, Fitchburg, WI (US)

(72) Inventor: Benjamin Ayd, Fitchburg, WI (US)

(73) Assignee: BACK MUSCLE SOLUTIONS LLC, Grant, MN (US)

( * ) Notice: Subject to any disclaimer, the term of this patent is extended or adjusted under 35 U.S.C. 154(b) by 627 days.

(21) Appl. No.: 17/395,722

(22) Filed: Aug. 6, 2021

(65) Prior Publication Data

US 2022/0133590 A1 May 5, 2022

Related U.S. Application Data

(60) Provisional application No. 63/198,603, filed on Oct. 29, 2020.

(51) Int. Cl.
*A61H 39/04* (2006.01)

(52) U.S. Cl.
CPC ..... *A61H 39/04* (2013.01); *A61H 2201/0142* (2013.01); *A61H 2201/1695* (2013.01); *A61H 2203/0456* (2013.01); *A61H 2205/081* (2013.01)

(58) Field of Classification Search
CPC .............. A61H 39/04; A61H 2205/081; A61H 2203/0456; A61H 2201/1695; A61H 2201/0142
See application file for complete search history.

(56) References Cited

U.S. PATENT DOCUMENTS

| | | | | |
|---|---|---|---|---|
| D823,479 S * | 7/2018 | Mollohan | .................... | D24/215 |
| 2010/0299838 A1* | 12/2010 | Lanci | ..................... | B60N 2/882 5/636 |
| 2022/0008284 A1* | 1/2022 | Smith | .................... | A61H 23/02 |

OTHER PUBLICATIONS

Gupta et al., "Shape Memory Polyurethane and its Composites for Various Applications" (Appl. Sci. 2019, 9, 4694; doi:0.3390/app9214694), ePub Nov. 4, 2019. (Year: 2019).*
Grzonkowska, et al., "Quantitative anatomy of the growing quadratus lumborum in the human foetus". Surg Radiol Anat. Jan. 2018; 40(1):91-98. (Year: 2018).*

* cited by examiner

*Primary Examiner* — Julian W Woo
*Assistant Examiner* — Cherie M Poland
(74) *Attorney, Agent, or Firm* — SCHWEGMAN LUNDBERG & WOESSNER, P.A.

(57) ABSTRACT

Techniques for triggering or massaging a deep back muscle of a user are provided. In an example, an apparatus can include a base, a slanted portion and a trigger portion. The base can include a number of sidewalls. The slanted portion can extend from a first major side of the base and can extend from an edge of a lateral sidewall of the base. The trigger portion can extend from the first major surface and can include a curved portion. A user's body weight and relaxed breathing can trigger or massage the deep back muscle via the trigger portion.

16 Claims, 5 Drawing Sheets

FIG. 4

QUADRATUS LUMBORUM MASSAGE APPARATUS AND TECHNIQUES

CROSS-REFERENCE TO RELATED APPLICATION

This patent application claims the benefit of U.S. Provisional Patent Application No. 63/198,603, filed Oct. 29, 2020, which is incorporated by reference herein in its entirety.

TECHNICAL FIELD

The disclosure herein relates generally to passive techniques for muscle manipulation and more particularly to techniques for manipulating back muscles of a user.

BACKGROUND

Back pain can be a particularly debilitating type of pain that can render discomfort to the victim no matter if the victim is engaged in activity or not. Once a cause is diagnosed, various techniques can be used to relieve the pain. Because the source of the pain is the back of the victim, massage techniques generally require the victim to set a side time to schedule and attend an appointment for the massage therapy which can take time and energy away from other activities considered by the patient to be more productive.

OVERVIEW

Techniques for triggering or massaging a deep back muscle of a user are provided. In an example, an apparatus can include a base, a slanted portion and a trigger portion. The base can include a number of sidewalls. The slanted portion can extend from a first major side of the base and can extend from an edge of a lateral sidewall of the base. The trigger portion can extend from the first major surface and can include a curved portion. A user's body weight and relaxed breathing can trigger or massage the deep back muscle via the trigger portion.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments.

The quadratus lumborum muscle, informally called the QL, is a paired muscle of the left and right posterior abdominal wall. It is the deepest abdominal muscle and is commonly referred to as a back muscle. Each is irregular and quadrilateral in shape. The quadratus lumborum muscles originate from the wings of the ilium; their insertions are on the transverse processes of the upper four lumbar vertebrae plus the lower posterior border of the twelfth rib. Contraction of one of the pair of muscles causes lateral flexion of the lumbar spine, elevation of the pelvis, or both. Contraction of both causes extension of the lumbar spine. A disorder of the quadratus lumborum muscles can be pain due to muscle fatigue from constant contraction due, for example, to prolonged sitting, such as at a computer or in a car, exercise, or combinations thereof. Kyphosis and weak gluteal muscles can also contribute to the likelihood of quadratus lumborum pain.

Figure 1:
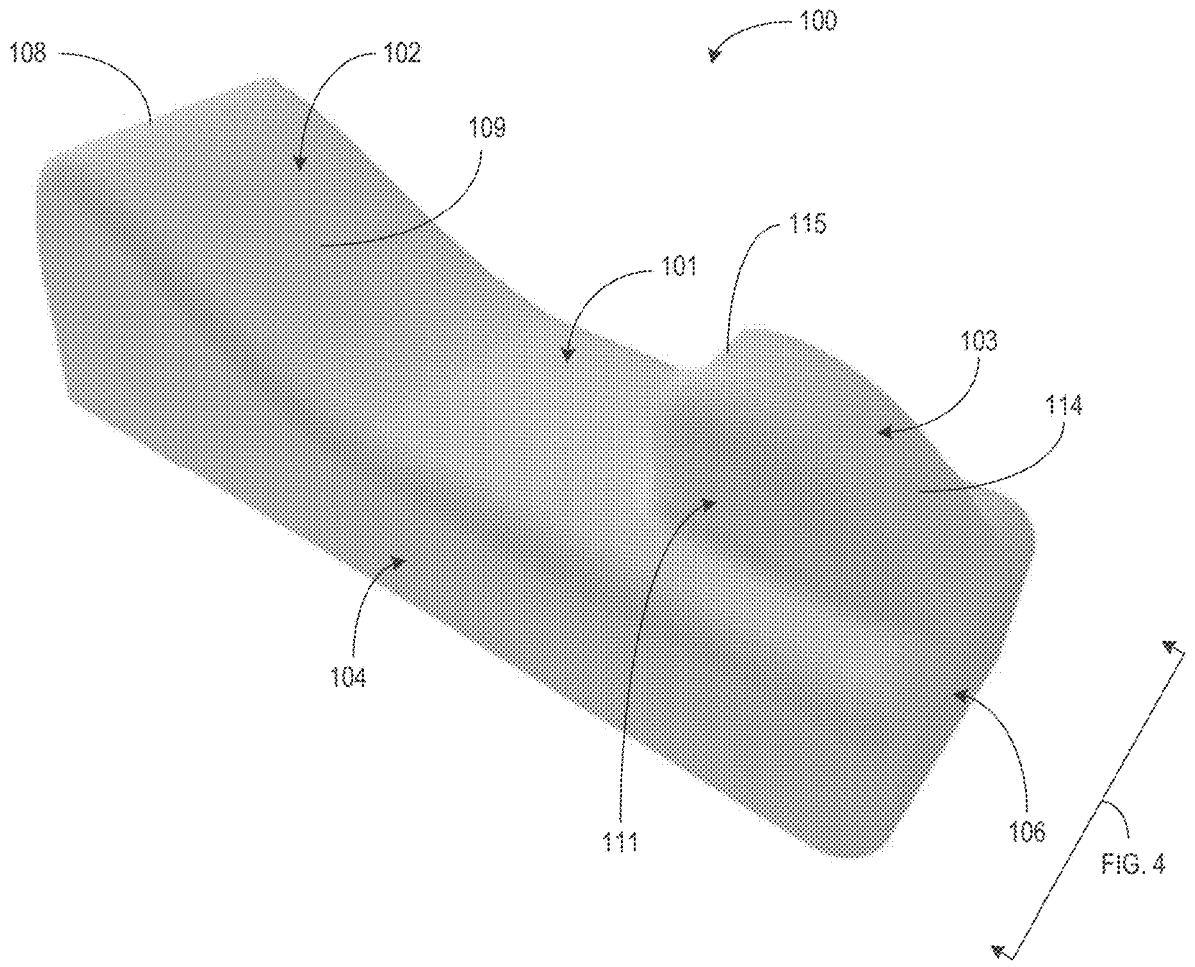
FIGS. 1 and 2 illustrate generally perspective views of an example back-muscle pain relief device according to the present subject matter.
Figure 2:
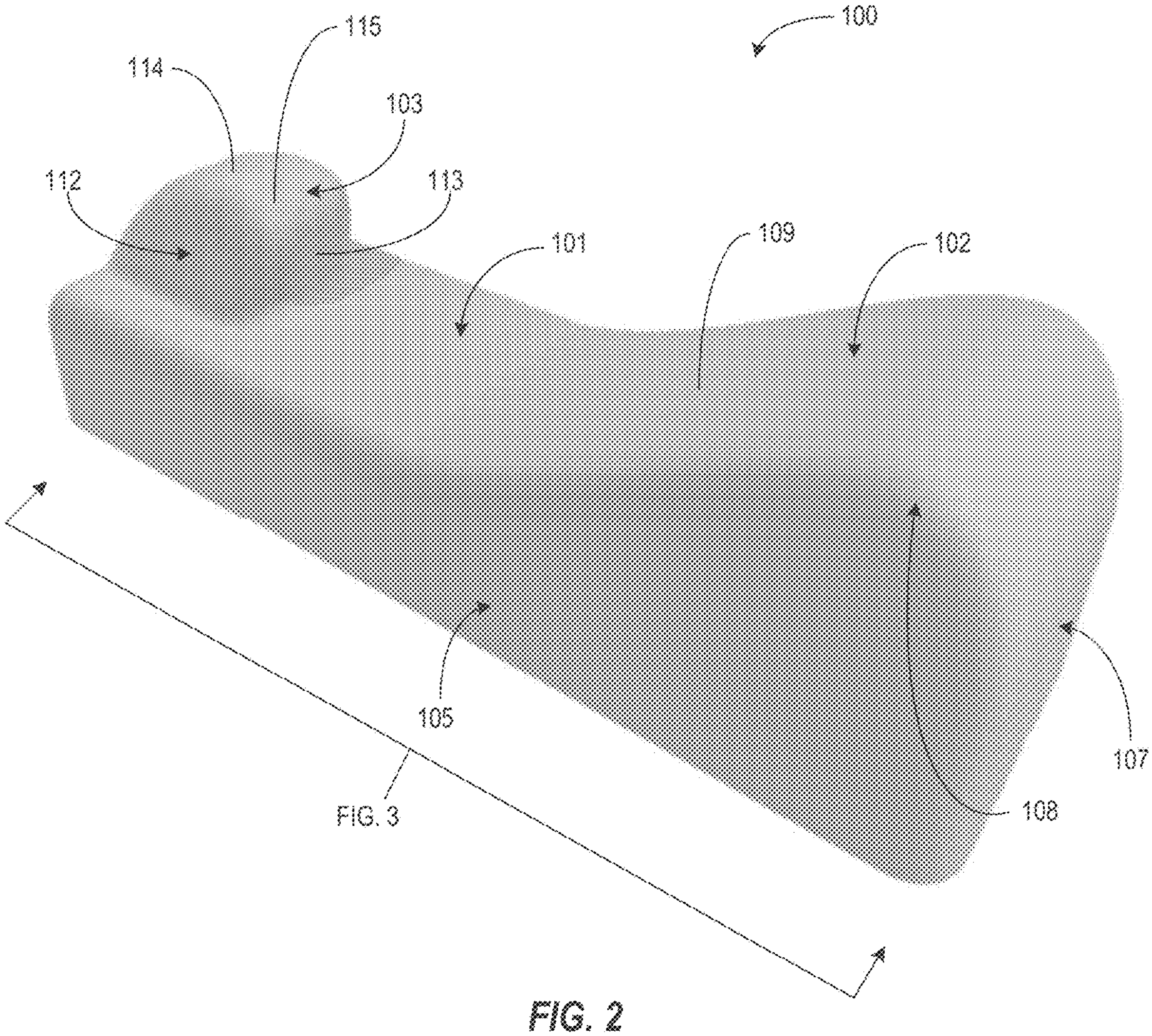
Figure 3:
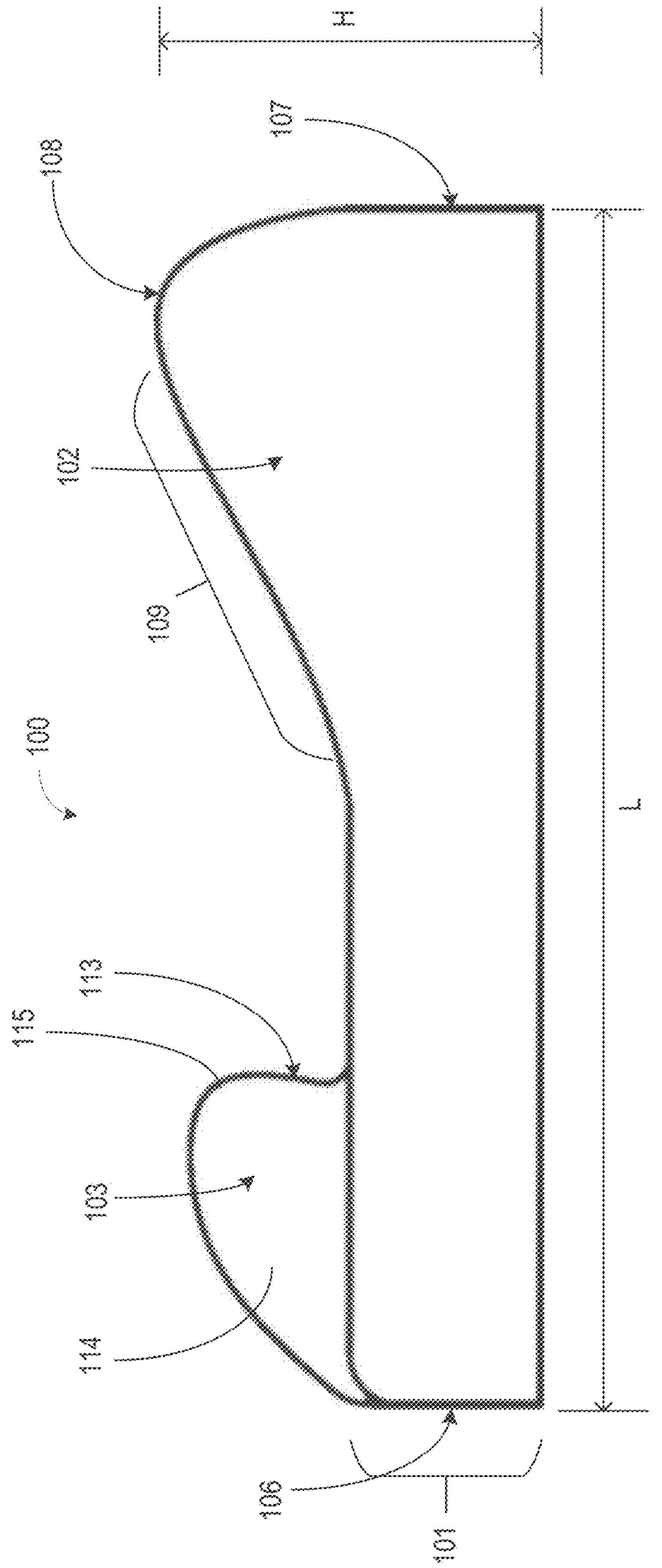
FIG. 3 illustrates generally a longitudinal side-elevation of the example back-muscle pain relief device.
Figure 4:
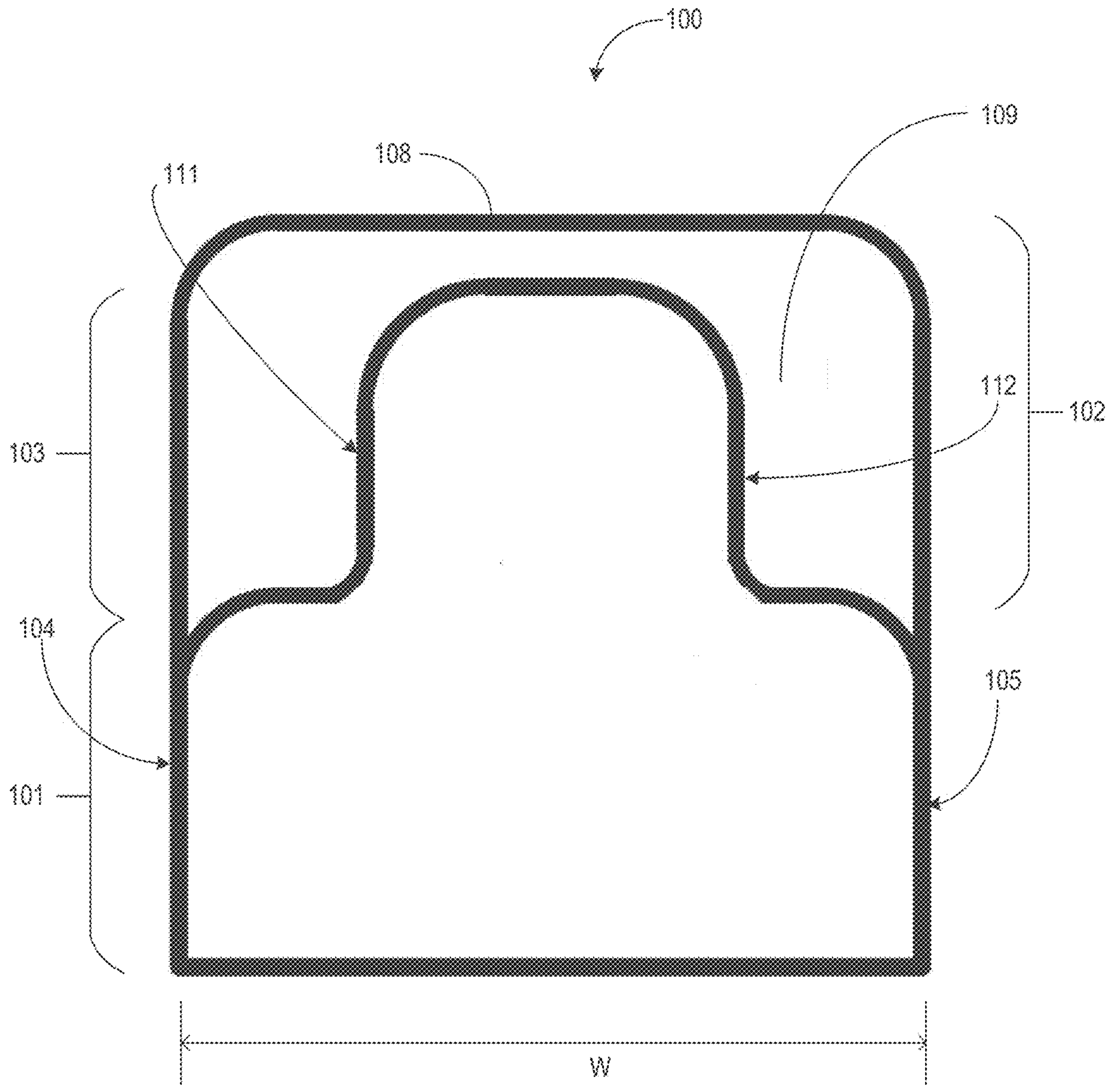
FIG. 4 illustrates generally a lateral side elevation of the example back-muscle pain relief device.

The present inventor has recognized techniques for manipulation of quadratus lumborum muscle tissue and an area adjacent thereto to relieve pain. Use of the device is somewhat passive and does not require another person such as a massage therapist, for example. FIGS. 1 and 2 illustrate generally perspective views of an example back-muscle pain relief device 100 according to the present subject matter. FIG. 3 illustrates generally a longitudinal side-elevation of the example back-muscle pain relief device 100. FIG. 4 illustrates generally a lateral side elevation of the example back-muscle pain relief device 100. The device 100 has a unique shape designed to target a quadratus lumborum (QL) muscle within a user. The device 100 includes a base 101, a slanted portion 102, and a trigger portion 103. For effective therapeutic use, the user can lay on the device 100 in a supine position. The base 101 provides a minimal height for the device 100 and provokes a natural arch to the back of the user when in use. The base 100 provides a rectangular, or a rounded rectangular, footprint including two long sides associated with two longitudinal sidewalls 104, 105, and two short sides associated with two lateral sidewalls 106, 107. In use, planes defined by the two longitudinal sidewalls 104, 105 are substantially perpendicular to the spine of the user.

The slanted portion 102 includes a first end that extends from a first lateral sidewall 107 and extends to an apex 108 above the height of the base. The ramp 109 of the slanted portion 102 extends from the apex 108 at the height of the first lateral sidewall 107 toward the second lateral sidewall 106. As the ramp 109 of the slanted portion 102 extends away from the apex 108 toward the second lateral sidewall 106, the height of the slanted portion 102 decreases toward the height of the base 101. In certain examples, the slanted portion 102 can terminate prior to extending to the second lateral sidewall 106. In certain examples, the slanted portion 102 terminates near a midpoint between the first lateral sidewall 107 and the second lateral sidewall 106.

When the device 100 is in use, with a user laying atop the device 100 in supine position, the slanted portion 102 can angle a non-target side of the back of the user from horizontal. As such, the center of gravity of the area of the user over the device 100 can be shifted away from the non-target side of the back. The shift in the center of gravity toward the target side of the back of the user can allow for additional activating pressure to be applied to the target quadratus lumborum muscle as discussed below.

The trigger portion 103 can extend from a top surface of the base 101. The trigger portion 103 can include a pair of longitudinal sidewalls 111, 112, a first lateral sidewall 113, and a curved portion 114 defining both a second lateral sidewall and a top surface of the trigger portion 103. The pair of longitudinal sidewalls 111, 112 of the trigger portion 103 can define a width of the trigger portion 103. In certain examples, the width of the trigger portion 103 can be smaller than the width of the base 101 as defined by the longitudinal sidewalls 104, 105 of the base 101. The first lateral sidewall 113 of the trigger portion 103 can extend from the top surface of the base 101 near or at the termination of the slanted portion 102. In certain examples, the first lateral sidewall 113 can extend from the top of the base at an acute angle such that the top of the trigger portion 103 is nearer to a plane defined by the first lateral wall 107 of the base 101 than the bottom of the trigger portion 103. In certain examples, an acute angle can allow the trigger portion 103 to better navigate pressure to the targeted quadratus lumborum muscle.

The trigger portion 103 also includes a curved portion 114 defining both a second lateral sidewall and a top surface of the trigger portion 103. In certain examples, the curved portion 114 can extend from the second lateral sidewall 106 of the base 101 as opposed to extending from a top surface of the base 101. As the curved portion 114 extends from the second lateral sidewall 106 of the base 101 it can curve from a vertical direction at the second lateral sidewall 106 to a horizontal direction at an apex 115 of the trigger portion 103 and then in a downward direction as the top of curved portion 114 meets with the first lateral sidewall 113 of the trigger portion 103. In certain examples, where the curved portion 114 meets the longitudinal sidewalls 111, 112 of the trigger portion 103, the corners at the intersection can be rounded. In certain examples, the curved portion 114 can translate and direct body weight of user toward applying pressure to the targeted quadratus lumborum muscle via the tip or apex 115 of the trigger portion 103, such as at or near where the curved portion 114 meets the first lateral sidewall 113. In certain examples, the back-muscle pain relief device 100 can be formed using a single unitary material such as, but not limited to, a single unitary piece of thermoplastic polyurethane (TPU). The back-muscle pain relief device 100 can also be formed using plastic, rubber, foam, and/or silicone.

In certain examples, the length, width and height (L, W, H) of the base 101 can be custom made to accommodate a user. Dimensions that fit a large number of user's is a width (W) of about 3 inches, a length (L) of about 10.0 inches and a height of about 3 inches. In certain examples, the height of just the base is about 1.5 inches to induce an arch of the back of the user. The term "about" here means a length, width, or height within 10% of the disclosed length, width, or height. In some examples, the heights of the slanted portion can be greater than the height of triggering portion. In some examples, the combined height of the base and the slanted portion can be about 5 percent higher than the combined height of the base and the trigger portion. In some examples, the combined height of the base and the slanted portion can be about 7 percent higher than the combined height of the base and the trigger portion. In some examples, the combined height of the base and the slanted portion can be about 10 percent higher than the combined height of the base and the trigger portion.

Figure 5:
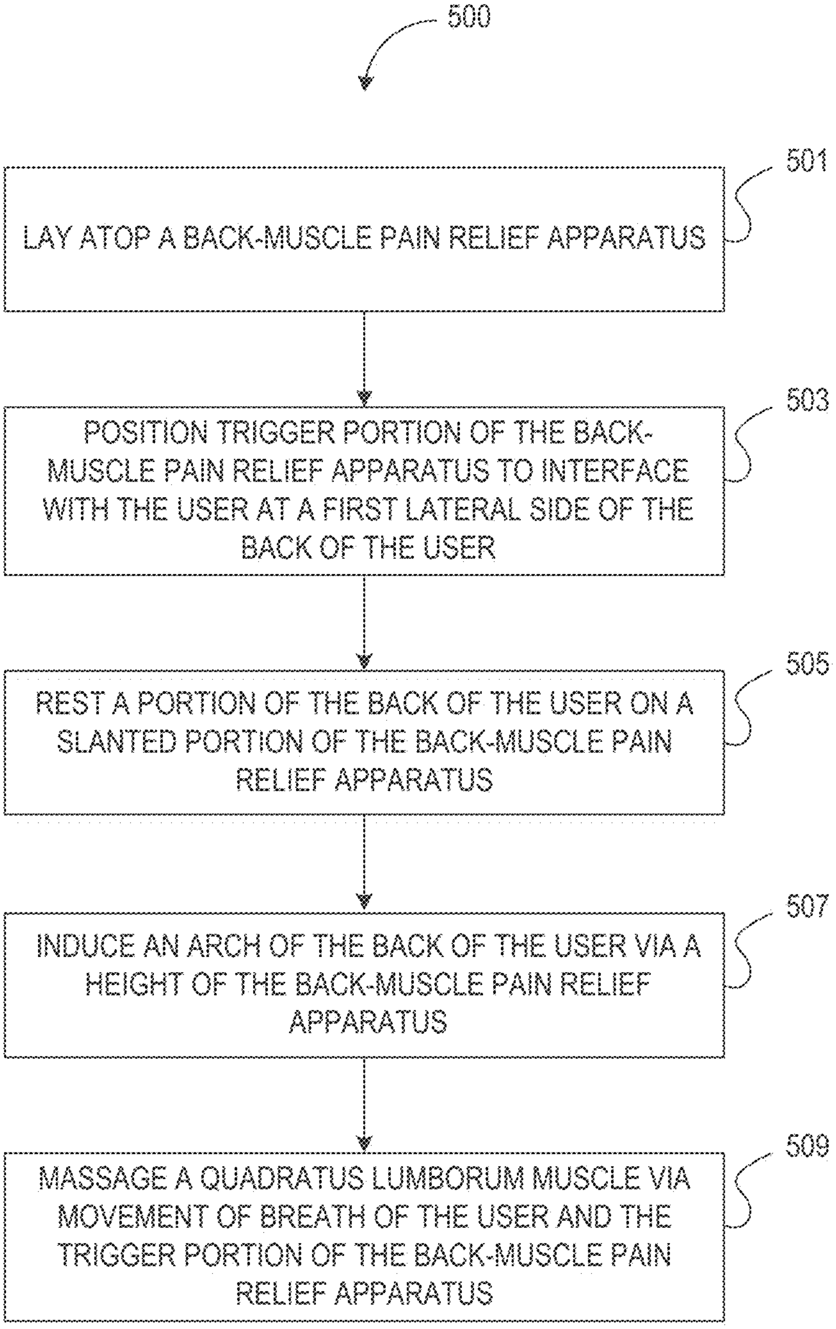
FIG. 5 illustrates generally an example method of operating a back-muscle pain relief device according to the present subject matter.

FIG. 5 illustrates generally an example method 500 of operating a back-muscle pain relief device according to the present subject matter. At 501, a user can lay atop the example back-muscle pain relief apparatus, such as the example apparatus discussed above with reference to FIGS. 1-4. At 503, a trigger portion of the pain relief apparatus can be positioned to interface with the user at a first lateral side of the spine of the user. At 505, a portion of the back of the user can rest or be positioned on a slanted portion of the pain relief apparatus, where the portion of the back of the user is an opposite lateral side of the spine from the location of the trigger portion. At 507, a height of the pain relief apparatus induces an arch along the spine of the user. At 509, massage or triggering of the quadratus lumborum muscle is induced via movement of breath of the user.

ADDITIONAL EXAMPLES AND NOTES

In a first example, Example 1, an apparatus for relieving pain of a back muscle of a user can include a base having first and second longitudinal sidewalls and first and second lateral sidewalls, wherein a length of each longitudinal sidewall is longer than a length of each lateral sidewall; a slanted portion extending from a first major side of the base and continuing to extend from an edge of the first lateral sidewall of the base; a trigger portion extending from a first major surface of the base and having a curved portion extending from the second lateral sidewall of the base; and wherein the trigger portion is configured to use body weight of the user to apply pressure to the back muscle.

In Example 2, the subject matter of Example 1 includes, wherein the back muscle is a quadratus lumborum muscle of the user.

In Example 3, the subject matter of Examples 1-2 includes, wherein the trigger portion includes a first lateral sidewall extending from the first major surface of the base at a location opposite the curved portion.

In Example 4, the subject matter of Example 3 includes, wherein the first lateral sidewall of the trigger portion extends from the first major surface of the base at an acute angle toward the slanted portion.

In Example 5, the subject matter of Examples 3-4 includes, wherein the curved portion defines an apex of the trigger portion and unites with an end of the first lateral sidewall of the trigger portion distal from the first major surface of the base.

In Example 6, the subject matter of Examples 1-5 includes, wherein the base, the slanted portion, and the trigger portion are formed as a unitary piece of material.

In Example 7, the subject matter of Examples 1-6 includes, wherein the apparatus does not include a lever, a crank, or a handle configured to operate the apparatus.

In Example 8, the subject matter of Examples 1-7 includes, wherein the apparatus does not include a powered component.

In Example 9, the subject matter of Examples 1-8 includes, wherein a single, unitary piece of thermoplastic polyurethane includes the base, the slanted portion, and the trigger portion.

Example 10 is a method for triggering a quadratus lumborum muscle of a user, the method comprising: lying in a supine position atop a pain relief apparatus; positioning a trigger portion of the pain relief apparatus at a first lateral side of a spine of the user.

In Example 11, the subject matter of Example 10 includes, vertebrae of the user.

Example 12 is an apparatus comprising means to implement of any of Examples 1-11.

Example 13 is a system to implement of any of Examples 1-11.

Example 14 is a method to implement of any of Examples 1-11.

Each of these non-limiting examples can stand on its own, or can be combined with one or more of the other examples in any permutation or combination. The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, the terms "including" and "comprising" are open-ended, that is, a system, device, article, composition, formulation, or process that includes elements in addition to those listed after such a term in a claim are still deemed to fall within the scope of that claim. Moreover, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of any claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. The following aspects are hereby incorporated into the Detailed Description, with each aspect standing on its own as a separate embodiment, and it is contemplated that such embodiments can be combined with each other in various combinations or permutations.

The invention claimed is:

1. An apparatus for relieving pain of a back muscle of a user, the apparatus comprising: a base having first and second longitudinal sidewalls and first and second lateral sidewalls, wherein a length of each longitudinal sidewall is longer than a length of each lateral sidewall; a slanted portion extending from a first major side of the base and continuing to extend from an edge of the first lateral sidewall of the base to a midpoint of the base, the slanted portion comprising a planar surface along an entire length of the slanted portion; and a trigger portion extending from a first major surface of the base and having a curved portion extending from the second lateral sidewall of the base; wherein an obtuse angle formed by the slanted portion with the base is in a direction of a perpendicular end wall of the trigger portion; wherein the slanted portion is configured to cause a shift in a center of gravity of the user towards a target side of the back muscle of the user; wherein a single, unitary piece of thermoplastic polyurethane includes the base, the slanted portion, and the trigger portion; wherein the back muscle is a quadratus lumborum muscle of the user, and wherein the trigger portion is configured to use body weight of the user to apply pressure to the back muscle.

2. The apparatus of claim 1, wherein the trigger portion includes a first lateral sidewall extending from the first major surface of the base at a location opposite the curved portion.

3. The apparatus of claim 2, wherein the first lateral sidewall of the trigger portion extends from the first major surface of the base at an acute angle toward the slanted portion.

4. The apparatus of claim 2, wherein the curved portion defines an apex of the trigger portion and unites with an end of the first lateral sidewall of the trigger portion distal from the first major surface of the base.

5. The apparatus of claim 1, wherein a width of the trigger portion is less than a width of the base.

6. The apparatus of claim 1, wherein the base, the slanted portion, and the trigger portion are formed as a unitary piece of material.

7. The apparatus of claim 1, wherein the apparatus does not include a lever, a crank, or a handle configured to operate the apparatus.

8. The apparatus of claim 1, wherein the apparatus does not include a powered component.

9. The apparatus of claim 1, wherein the slanted portion terminates at a midpoint between the first lateral sidewall and the second lateral sidewall.

10. The apparatus of claim 1, wherein the first and second longitudinal sidewalls comprise a length of approximately 10.0 inches, the first and second lateral sidewalls comprise a length of approximately 3 inches, and the base comprises a height of approximately 3 inches.

11. The apparatus of claim 1, wherein the base comprises a height of approximately 1.5 inches.

12. The apparatus of claim 1, wherein a height of the slanted portion is greater than a height of the triggering portion.

13. The apparatus of claim 1, wherein a combined height of the base and the slanted portion is approximately 5 percent higher than a combined height of the base and the trigger portion.

14. The apparatus of claim 1, wherein a combined height of the base and the slanted portion is approximately 7 percent higher than a combined height of the base and the trigger portion.

15. The apparatus of claim 1, wherein a combined height of the base and the slanted portion is approximately 10 percent higher than a combined height of the base and the trigger portion.

16. A method for triggering a quadratus lumborum muscle of a user, the method comprising:

lying in a supine position atop a pain relief apparatus;

positioning a trigger portion of the pain relief apparatus at a first lateral side of a spine of the user;

resting a portion of a back of the user on a slanted portion of the pain relief apparatus, wherein the slanted portion extends from a first major side of a base of the pain relief apparatus and continues to extend from an edge of a first lateral sidewall of the base of the pain relief apparatus to a midpoint of the base of the pain relief apparatus, the slanted portion comprising a planar surface along an entire length of the slanted portion;

wherein the portion of the back is located on an opposite lateral side of the spine from the trigger portion;

wherein a height of the pain relief apparatus is configured to induce an arch along the spine of the user;

wherein the positioning the trigger portion of the pain relief apparatus includes positioning the trigger portion along the first lateral side at a level within a range defined by an L2 vertebrae of the user and an L4 vertebrae of the user; and wherein breathing of the user is configured to induce the trigger portion to massage the quadratus lumborum muscle.

* * * * *